United States Patent
Bordes et al.

(10) Patent No.: US 9,961,353 B2
(45) Date of Patent: May 1, 2018

(54) METHOD AND DEVICE FOR DECODING A SCALABLE STREAM REPRESENTATIVE OF AN IMAGE SEQUENCE AND CORRESPONDING CODING METHOD AND DEVICE

(71) Applicant: THOMSON LICENSING, Issy les Moulineaux (FR)

(72) Inventors: Philippe Bordes, Laille (FR); Patrick Lopez, Livré sur Changeon (FR); Mehmet Turkan, Rennes (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 16 days.

(21) Appl. No.: 14/905,960

(22) PCT Filed: Jul. 10, 2014

(86) PCT No.: PCT/EP2014/064817
§ 371 (c)(1),
(2) Date: Jan. 18, 2016

(87) PCT Pub. No.: WO2015/007604
PCT Pub. Date: Jan. 22, 2015

(65) Prior Publication Data
US 2016/0165244 A1 Jun. 9, 2016

(30) Foreign Application Priority Data
Jul. 17, 2013 (FR) ........................... 13 57034

(51) Int. Cl.
*G06K 9/36* (2006.01)
*H04N 19/34* (2014.01)
(Continued)

(52) U.S. Cl.
CPC ............ *H04N 19/34* (2014.11); *H04N 19/159* (2014.11); *H04N 19/176* (2014.11); *H04N 19/33* (2014.11);
(Continued)

(58) Field of Classification Search
CPC ...... H04N 19/34; H04N 19/44; H04N 19/187; H04N 19/33; H04N 19/159; H04N 19/46;
(Continued)

(56) References Cited

U.S. PATENT DOCUMENTS

2006/0133503 A1 6/2006 Park et al.
2008/0007438 A1 1/2008 Segall et al.
(Continued)

FOREIGN PATENT DOCUMENTS

CN 102439976 A 5/2012
CN 101415120 B 8/2012
(Continued)

OTHER PUBLICATIONS

Kim C et al: "Description of scalabl video coding technology proposal by L Electronics and MediaTek (differentic coding mode on)", MPEG Meeting Oct. 10, 2012-Oct. 19, 2012.*
(Continued)

*Primary Examiner* — Li Liu
(74) *Attorney, Agent, or Firm* — Brian J. Dorini; Ronald K. Kolczynski (57) ABSTRACT

Different implementations are described, in particular, implementations for coding and decoding a scalable stream comprising a base layer and at least one enhancement layer. For example, one method provides for decoding a first part of the enhancement layer relating to a group of blocks into decoded enhancement data which comprise at least one item of information for identifying at least one region of the reconstructed at least one image and obtaining residues for
(Continued)

at least one block of the group of blocks from a second part of the enhancement layer.

35 Claims, 4 Drawing Sheets

(51) Int. Cl.
| | |
|---|---|
| *H04N 19/50* | (2014.01) |
| *H04N 19/159* | (2014.01) |
| *H04N 19/176* | (2014.01) |
| *H04N 19/46* | (2014.01) |
| *H04N 19/96* | (2014.01) |
| *H04N 19/33* | (2014.01) |
| *H04N 19/36* | (2014.01) |
| *H04N 19/44* | (2014.01) |

(52) U.S. Cl.
CPC .............. *H04N 19/36* (2014.11); *H04N 19/44* (2014.11); *H04N 19/46* (2014.11); *H04N 19/50* (2014.11); *H04N 19/96* (2014.11)

(58) Field of Classification Search
CPC ...... H04N 19/176; H04N 19/70; H04N 19/61; H04N 19/172; H04N 19/59; H04N 19/30; H04N 19/119; H04N 19/157; H04N 19/50; H04N 19/52; H04N 19/103
See application file for complete search history.

(56) References Cited

U.S. PATENT DOCUMENTS

| | | | | |
|---|---|---|---|---|
| 2008/0260043 | A1* | 10/2008 | Bottreau | H04N 19/105 375/240.26 |
| 2011/0090959 | A1 | 4/2011 | Wiegand et al. | |
| 2014/0072033 | A1* | 3/2014 | Chuang | H04N 19/70 375/240.02 |
| 2015/0071356 | A1* | 3/2015 | Kim | H04N 19/513 375/240.16 |
| 2015/0195566 | A1* | 7/2015 | Hinz | H04N 19/105 375/240.13 |
| 2015/0256828 | A1* | 9/2015 | Dong | H04N 19/187 375/240.02 |
| 2016/0007032 | A1* | 1/2016 | Alshina | H04N 19/59 375/240.02 |
| 2016/0014411 | A1* | 1/2016 | Sychev | H04N 19/56 375/240.12 |
| 2016/0029029 | A1* | 1/2016 | Lee | H04N 19/187 382/233 |
| 2016/0044309 | A1* | 2/2016 | Choi | H04N 19/50 375/240.12 |
| 2016/0065976 | A1* | 3/2016 | He | H04N 19/33 375/240.12 |
| 2016/0065980 | A1* | 3/2016 | Choi | H04N 19/70 375/240.25 |

FOREIGN PATENT DOCUMENTS

| | | |
|---|---|---|
| JP | 5063684 B2 | 10/2012 |
| KR | 1066117 B1 | 9/2011 |
| WO | 2008060126 A1 | 5/2008 |
| WO | 2010128628 A1 | 11/2010 |
| WO | 2012122425 A1 | 9/2012 |
| WO | 2012167712 A1 | 12/2012 |

OTHER PUBLICATIONS

Chen et al: "High efficiency video coding (HEVC) scalable extension draft 3", Joint Collaborative Team on Vodeo Coding (JCT-VC) of ITU-T SG 16 WP 3 and ISO/IEC JTC 1/SC 29/WG 11, JCTVC-N1008_v3, 14th Meeting: Vienna, AT, Jul. 25-Aug. 2, 2013.

Chen, Jianle "SHVC Draft Text 1" ITU-T SG16 WP3 and ISO/IEC JTC1/SC29/WG11 12th Meeting: Geneva, CH, Jan. 14-23, 2013.

Chen, Jianle "SHVC Test Model 2 (SHM 2)" ITU-T SG16 WP3 and ISO/IEC JTC1/SC29/WG11 13th Meeting: Incheon, KR, Apr. 18-26, 2013.

Edouard Francois et al. "Extended spatial scalability: A generalization of spatial scalability for SVC extension of AVC/H.264" Proc. PCS, Beijing, China, 2006.

Wiegand et al. "Text of ISO/IEC FDIS 14496-10: Information Technology—Coding of audio-visual objects—Part 10: Advanced Video Coding" ISO/IEC 2003.

Kim et al. "Description of scalable video coding technology proposal by LG Electronics and MediaTek (differential coding mode on)" ITU-T SG16 WP3 and ISO/IEC JTC1/SC29/WG11 11th Meeting: Shanghai, CN, Oct. 10-19, 2012.

Ian e. G. Richardson "H.264 and MPEG-4 Video Compression" John Wiley & Sons Ltd., 2003.

Schwarz et al. "Overview of the Scalable Video Coding Extension of the H.264/AVC Standard", IEEE Transactions on Circuits and Systems for Video Technology, vol. 17, No. 9, Sep. 2007.

Shi et al. "Spatially Scalable Video Coding for HEVC", IEEE Transactions on Circuits and Systems for Video Technology, vol. 22, No. 12, Dec. 2012.

\* cited by examiner

| 0 | 1 | 1 | 0 |
|---|---|---|---|
| 0 | 0 | 0 | 1 |

Figure 12

METHOD AND DEVICE FOR DECODING A SCALABLE STREAM REPRESENTATIVE OF AN IMAGE SEQUENCE AND CORRESPONDING CODING METHOD AND DEVICE

This application claims the benefit, under 35 U.S.C. § 365 of International Application PCT/EP14/064817, filed Jul. 10, 2014, which was published in accordance with PCT Article 21(2) on Jan. 22, 2015 in English and which claims the benefit of French patent application 1357034, filed Jul. 17, 2013.

1. DOMAIN OF THE INVENTION

The invention relates to the general domain of the scalable coding of an image sequence. More particularly, the invention also relates to a method for decoding a scalable stream representative of an image sequence comprising a base layer and at least one enhancement layer. The invention also relates to a coding method and the corresponding devices.

2. PRIOR ART

Figure 1:
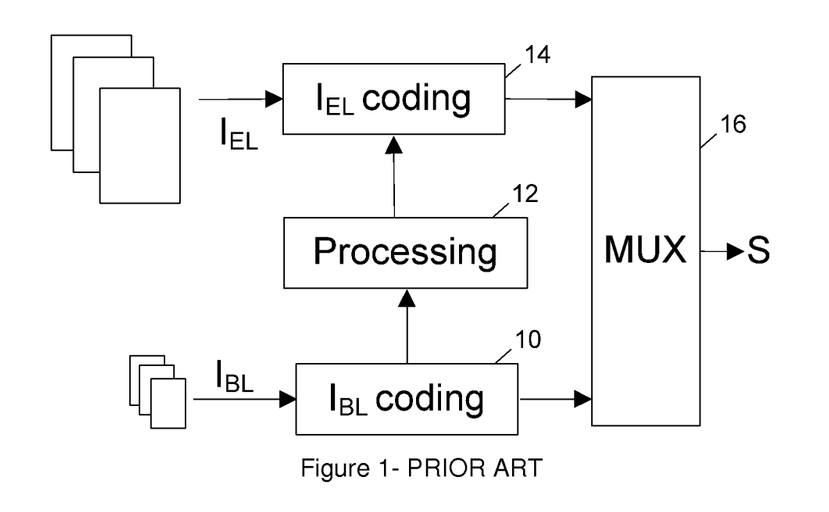
FIG. 1 shows a coding method according to the prior art.

Scalable coding methods are known that enable the information to be coded in a hierarchical manner such that this information can be decoded at different resolutions (spatial scalability), different qualities (SNR scalability, for "Signal to Noise Ratio"), with different gamuts or colour spaces (CGS scalability, for "Colour Gamut Scalability"). A stream generated by a scalable coder is divided into different layers: a base layer and one or more enhancement layers. Such devices can generate a stream of data that adapts to different transmission conditions (bandwidth, error rate, etc.) and also to the capacities of the reception devices. A scalable coder spatially codes a first part of data relating to low resolution images in a base layer and another part of data relating to high resolution images (i.e. having a size in number of horizontal and/or vertical pixels greater than the low resolution image) in at least one enhancement layer. The data coded in the enhancement layer is generally done so by taking into account data from the base layer so as to reduce the redundancy between the low resolution images and high resolution images and thus to reduce the coding cost. In reference to FIG. 1, it is known to code 10 the low resolution images, called $I_{BL}$ images, reconstruct them at least partially and process 12 them, that is to say re-sample them at the size of the high resolution images, called $I_{EL}$ images. The $I_{BL}$ images re-sampled in this manner are used to predict the $I_{EL}$ images with a view to their coding 14. The different layers can possibly be multiplexed 16 into a single scalable stream S. The scalable coding is not limited to spatially scalable coding. Hence, scalable coders are known that code, in a base layer, data relating to images represented in a first colour space and that code, in at least one enhancement layer, data relating to images represented in a second colour space different from the first colour space. The images of the base layer reconstructed at least partially are then processed so that their characteristics in terms of colour are close to those of the images of the enhancement layer. The $I_{BL}$ images processed in this manner are used to predict the $I_{EL}$ images with a view to their coding.

Generally, an image of the base layer is fully processed before being stored in the reference image buffer or DPB (decoding picture buffer) of the enhancement layer. The processing of an image of the base layer is, for example, carried out just before the decoding of an image of the enhancement layer that it is used to predict. Such a solution requires the processing of the entire image of the reconstructed base layer which can be costly in terms of calculations.

According to a variant, when a block of the enhancement layer is reconstructed from an image of the base layer, the coding mode of the block indicates it. It is therefore possible, when decoding such a block of the enhancement layer to check the coding mode of this block and only process the region of the image of the reconstructed base layer necessary for reconstructing the relevant block. In this case, the processing of the image of the reconstructed base layer necessary for reconstructing the relevant block is carried out just after the decoding of the coding mode of the block. This solution is economic in terms of calculations as only the regions of reconstructed images of the base layer necessary for reconstructing the images of the enhancement layer are processed. However, this solution requires many accesses to the buffer storing the images of the reconstructed base layer and many calls to the processing function. Indeed, the processing function is called as many times as a block whose coding mode indicates that it is predicted in relation to a base layer image (e.g. inter-layer mode) is decoded.

3. SUMMARY OF THE INVENTION

The purpose of the invention is to overcome at least one of the disadvantages of the prior art. For this purpose, a method for decoding a scalable stream comprising a base layer and at least one enhancement layer is described. The method comprises:

reconstructing at least one image from the base layer,
decoding a first part of the at least one enhancement layer relating to a group of blocks into decoded enhancement data which comprise at least one item of information for identifying at least one region of the reconstructed image to process,
processing the at least one region of the reconstructed image identified by the information,
obtaining residues for at least one block of the group of blocks from a second part of the at least one enhancement layer, and
reconstructing the blocks of the group from residues and from the at least one region processed.

This decoding method advantageously reduces the number of accesses to the processing function but also processes only the useful regions of the image of the reconstructed base layer.

According to a particular embodiment, the information for identifying at least one region of the reconstructed image to process is a map indicating for each block of the reconstructed image corresponding to a block of the group of blocks if the block must be processed or not.

According to a variant, the information for identifying at least one region of the reconstructed image to process is a map indicating for each block of the group of blocks if the block uses for its reconstruction a processed block of the reconstructed image.

According to a particular characteristic of the invention, the base layer is another enhancement layer of a lower level than the at least one enhancement layer.

Advantageously, the method comprises a decoding step from the enhancement layer of an additional item of information for at least one group of blocks indicating whether the information for identifying at least one region of the reconstructed image to process is coded or not for the group of blocks.

According to a particular characteristic of the invention, the group of blocks is an image slice or an image.

According to another aspect of the invention, the decoding method comprises a decoding step from the enhancement layer of a first additional item of information indicating whether the information for identifying at least one region of the reconstructed image to process can be coded or not for the group of blocks.

According to a particular characteristic of the invention, the first item of additional information being decoded for at least one image, the method comprises, when the first item of additional information indicates that an item of information for identifying at least one region of the reconstructed image to process can be coded, a decoding step from the enhancement layer of a second item of additional information indicating for a group of blocks whether the information for identifying at least one region of the reconstructed image is coded or not for the group of blocks.

A coding method of a sequence of images in the form of a scalable stream comprising a base layer and at least one enhancement layer is also described. The coding method comprises:
- coding in the base layer and reconstructing at least one image,
- coding enhancement data in a first part of the enhancement layer relating to a group of blocks, the enhancement data comprising an item of information for identifying at least one region of the reconstructed image to process,
- processing the at least one region of the reconstructed image identified by the information,
- obtaining residues for at least one block of the group of blocks from the blocks of the group and from the at least one region processed, and
- coding the residues in a second part of the enhancement layer.

According to a particular embodiment, the information for identifying at least one region of the reconstructed image to process is a map indicating for each block of the reconstructed image corresponding to a block of the group of blocks if the block must be processed or not.

According to a variant, the information for identifying at least one region of the reconstructed image to process is a map indicating for each block of the group of blocks if the block uses for its reconstruction a processed block of the reconstructed image.

According to a particular characteristic of the invention, wherein the base layer is another enhancement layer of a lower level than the at least one enhancement layer.

Advantageously, the method comprises a coding step in the enhancement layer of an additional item of information for at least one group of blocks indicating whether the information for identifying at least one region of the reconstructed image to process is coded or not for the group of blocks.

As a variant, the coding method comprises a coding step in the enhancement layer of a first additional item of information indicating whether the information for identifying at least one region of the reconstructed image to process can be coded or not for a group of blocks.

According to a particular characteristic of the invention, the first item of additional information being coded for at least one image, the method comprises, when the first item of additional information indicates that an item of information for identifying at least one region of the reconstructed image to process can be coded, a coding step in the enhancement layer of a second item of additional information indicating for a group of blocks whether the information for identifying at least one region of the reconstructed image is coded or not for the group of blocks.

A decoder configured for decoding a scalable stream comprising a base layer and at least one enhancement layer is also described. The decoder comprises:
- means for reconstructing at least one image from the base layer,
- means for decoding a first part of the at least one enhancement layer relating to a group of blocks into decoded enhancement data which comprise at least one item of information for identifying at least one region of the reconstructed image to process,
- means for processing the at least one region of the reconstructed image identified by the information,
- means for obtaining residues for at least one block of the group of blocks from a second part of the at least one enhancement layer, and
- means for reconstructing the blocks of the group from residues and from the at least one region processed.

The decoder is configured to execute the steps of the decoding method according to one of the embodiments.

A coder configured to code a sequence of images in the form of a scalable stream comprising a base layer and at least one enhancement layer is described which comprises:
- means for coding in the base layer and for reconstructing at least one image,
- means for coding enhancement data in a first part of the enhancement layer relating to a group of blocks, the enhancement data comprising an item of information for identifying at least one region of the reconstructed image to process,
- means for processing the at least one region of the reconstructed image identified by the information,
- means for obtaining residues for at least one block of the group of blocks from the blocks of the group and from the at least one region processed, and
- means for coding the residues in a second part of the enhancement layer.

The coder is configured to execute the steps of the coding method according to one of the embodiments described.

A coded data stream representative of a sequence of images comprising a base layer and at least one enhancement layer, the base layer comprising data relative to at least one image of the base layer and the enhancement layer comprising in a first part relating to a group of blocks enhancement data which comprise an item of information for identifying at least one region of the image of the base layer to process after reconstruction and in a second part data representative of residues which are obtained from at least one block of the group and from the at least one region processed.

A computer program product is described that comprises program code instructions for executing the steps of the decoding method according to one of the embodiments, when the program is executed on a computer.

A computer program product is described that comprises program code instructions for executing the steps of the coding method according to one of the embodiments, when the program is executed on a computer.

4. LIST OF FIGURES

The invention will be better understood and illustrated by means of non-restrictive embodiments and advantageous implementations, with reference to the accompanying drawings, wherein.

5. DETAILED DESCRIPTION OF THE INVENTION

The invention relates to a device for decoding a scalable stream representative of an image sequence comprising a base layer and at least one enhancement layer.

An image sequence is a series of several images. Each image comprises pixels or image points, with each of which is associated at least one item of image data. An item of image data is for example an item of luminance data or an item of chrominance data. In the remainder of the description, the coding and decoding methods are described with reference to blocks of pixels. It is clear that these methods can be applied to several blocks of an image and to several images of a sequence with a view to coding respectively the reconstruction of one or more images. In the specific case of scalability, a scalable stream represents an image sequence in different versions, for example, different resolutions, different gamuts/colour spaces, etc.

The expression "motion data" is to be understood in the widest sense. It signifies the motion vectors and possibly the reference image indexes enabling a reference image to be identified in the image sequence. It can also comprise an item of information indicating the interpolation type used to determine the prediction block. In fact, in the case where the motion vector associated with a block Bc does not have integer coordinates, the image data must be interpolated in the reference image Iref to determine the prediction block. The motion data associated with a block is generally calculated by a motion estimation method, for example by block pairing. However, the invention is in no way limited by the method enabling a motion vector to be associated with a block.

The expression "residual data" designates data obtained after extraction of other data. The extraction is generally a subtraction pixel by pixel of prediction data from source data. However, the extraction is more general and comprises notably a weighted subtraction. The expression "residual data" is synonymous with the term "residue".

The expression "transformed residual data" designates residual data to which a transform has been applied. A DCT (Discrete Cosine Transform) is an example of such a transform described in chapter 3.4.2.2 of the book by I. E. Richardson entitled "H.264 and MPEG-4 video compression" published by J. Wiley & Sons in September 2003. The wavelet transform described in chapter 3.4.2.3 of the book by I. E. Richardson and the Hadamard transform are other examples. Such transforms "transform" a block of image data, e.g. luminance and/or chrominance residual data, into a "block of transformed data" also called "transformed block", "frequency data block" or "block of coefficients".

The block of coefficients generally comprises a low-frequency coefficient known under the name of direct current coefficient or DC coefficient and high-frequency coefficients known under the name of AC coefficients.

The expression "prediction data" designates data used to predict other data. A prediction block or predictor is a block of pixels with which prediction data is associated.

A prediction block is obtained from a block or several blocks of the same image as the image to which belongs the block that it predicts (spatial prediction or intra-image prediction) or from one (mono-directional prediction) or several blocks (bi-directional or bi-predicted prediction) of a different image (temporal prediction or inter-image prediction) of the image to which the block that it predicts belongs. In the scalable case, a prediction block can also be obtained for a block of an enhancement layer from at least one block of an image of the base layer, e.g. the co-located block (inter-layer prediction).

The expression "prediction mode" designates the way in which a block is predicted. The expression "coding mode" designates the way in which a block is coded in the stream. It includes the prediction mode if it is predicted. Among the prediction modes, there is the INTRA mode that corresponds to a spatial prediction, the INTER mode that corresponds to a temporal prediction, the INTER-LAYER mode that corresponds to an inter-layer prediction. Note that the INTER-LAYER mode can be implemented like an INTER mode if the reconstructed image of the base layer is stored in the reference buffer of the enhancement layer. The standard INTER modes are thus distinguished from an INTER mode corresponding to an INTER-LAYER mode by the value of the reference index. The prediction mode can specify the way in which the block is partitioned to be coded. Thus, the 8×8 INTER prediction mode associated with a block of size 16×16 signifies that the 16×16 block is partitioned into 4 8×8 blocks and predicted by temporal prediction.

The expression "reconstructed data" designates data (for example pixels, blocks) obtained after merging residues with prediction data. The merge is generally a sum of prediction data with residues. However, merging is more general and comprises notably the weighted sum. A reconstructed block is a block of reconstructed pixels.

A "causal neighbouring area" of a current block designates a neighbouring area of this block that comprises pixels codes/reconstructed before those of the current block.

In reference to image decoding, the terms "reconstruction" and "decoding" are very often used as being synonymous. Thus, a "reconstructed block" is also designated under the terminology of "decoded block".

The term coding is to be taken in the widest sense. The coding can possibly comprise the transformation and/or the quantization of image data. It can also designate the entropy coding only.

Figure 2:
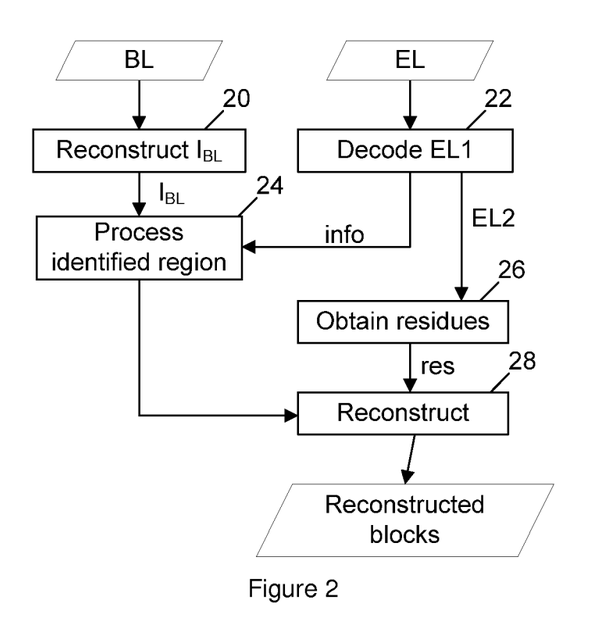
FIG. 2 shows a decoding method according to a particular and non-restrictive embodiment of the invention.

FIG. 2 shows a decoding method of a scalable stream S comprising a base layer and at least one enhancement layer according to a particular and non-restrictive embodiment of the invention. Naturally, the invention described for a base layer and an enhancement layer can be applied to two enhancement layers of different levels, the lower enhancement layer playing the role of a base layer with respect to the upper level layer.

During a step 20, at least one image $I_{BL}$ of the base layer is reconstructed from the base layer. For this purpose, the base layer is decoded at least partially by entropy decoding, for example by CABAC decoding ("Context-adaptive binary arithmetic coding") or CAVLC ("Context-adaptive variable-length coding") decoding. The decoded data notably comprises data representative of residues, for example quantized DCT coefficients, coding modes, possibly motion data. The reconstruction of the image $I_{BL}$ for a current block of the image comprises the obtaining of a spatial or temporal predictor according to the coding mode of the block. The predictor is obtained from a part of an image previously reconstructed either in the same image as the current block to reconstruct (spatial prediction) or in another image (temporal prediction) called reference image. The predictor is added to residues to reconstruct the current block. The residues are, for example, obtained by inverse quantization and inverse transformation of data relating to residues obtained during the entropy decoding of the base layer. The term inverse is used to signify that the quantization and transformation operations on the decoder are inverse from those used on the coder. According to a variant, no predictor is added to the residues in the specific case where the current block is coded without prediction (e.g. according to the IPCM Intra mode of H.264). The residues correspond in the latter case directly to the reconstructed current block. According to another variant, the residues are null. This is particularly the case for a current block coded according to a particular coding mode called skip mode. The reconstructed current block is the prediction block in this case. The reconstruction process described for a current block is reiterated to reconstruct the image $I_{BL}$ of the base layer. Naturally, this process can also be reiterated to reconstruct all the images of the base layer.

During a step 22, a first part EL1 of the enhancement layer relating to a group of blocks is decoded into decoded enhancement data, the group of blocks belonging to an image of the enhancement layer to reconstruct. The part EL1 is decoded by entropy decoding, e.g. by CABAC decoding. The decoded enhancement data thus comprise information relating to the group of blocks of the image of the enhancement layer to reconstruct. A group of blocks is for example an image or an image slice. For example, this enhancement data is obtained by decoding an image slice header, a PPS (Picture Parameter Set) or even a message SEI (Supplemental Enhancement Information). The terms PPS and SEI are notably defined in paragraph 3.107 (definition) and the appendix D respective of the ISO/IEC document 14496-10 describing the video coding standard H.264. Indeed, such elements contain information relating to a group of blocks. However, note that an image slice can only contain a single block. However, coding images with image slices of a single block is ineffective in terms of bitrate. Slice coding, each slice containing several blocks, e.g. 2 blocks, groups common information together and thus prevents duplicating the same information in the headers of each block. Advantageously, this decoded enhancement data comprises an item of information info for identifying at least one region of the image $I_{BL}$ reconstructed in step 20 to process. Hence, from the decoding of the first part of enhancement layer EL1 relating to the group of blocks, the decoder has knowledge of the region of the reconstructed image $I_{BL}$ to process, i.e. the one that will effectively be used during the reconstruction of an image of the enhancement layer. This information can thus distinguish between the regions of the reconstructed image $I_{BL}$ that will be used during the reconstruction of an image of the enhancement layer and hence that must be processed and those that will not be used and hence that must not be processed.

This information info is presented for example in the form of a map indicating for each block of the group of blocks of the enhancement layer whether the corresponding region, e.g. the block, of the base layer must be processed or not. A region of the reconstructed image $I_{BL}$ corresponds to a block of an image of the enhancement layer if it is co-located, i.e. if it occupies in the image the same spatial position possibly after processing (spatial scalability case).

Figure 3:
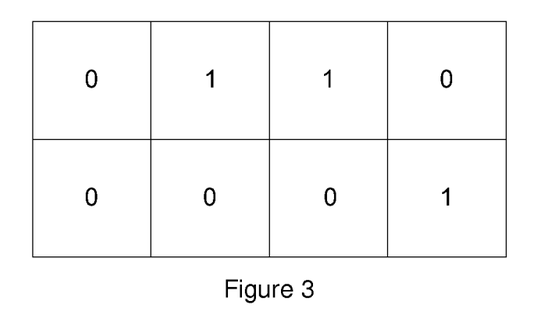
FIGS. 3 and 4 show an item of information info in a specific map form to identify at least one region of an image of the reconstructed base layer to process.
Figure 4:
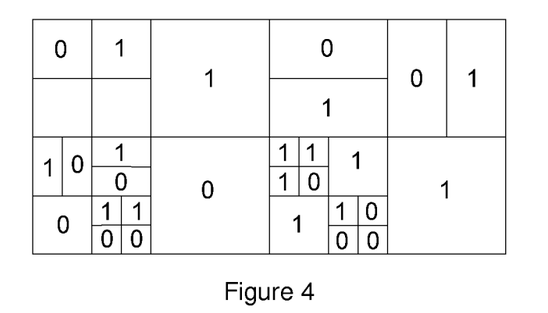

As a variant, the information info is presented for example in the form of a map indicating for each region, e.g. block, of the reconstructed image $I_{BL}$ corresponding to a block of the group of blocks if this region must be processed or not. This information irrespective of whether it relates to the base layer or to the enhancement layer is coded in the form of a regular map, e.g. in the case of the HEVC standard for each CTU (Coding Tree Unit) or for example for each macroblock as shown in FIG. 3. According to an embodiment variant, this information is coded in the form of an irregular map, e.g. in the case of the HEVC standard for each CU (Coding Unit) as shown in FIG. 4. In these figures, a value 0 indicates that the reconstructed region $I_{BL}$ is not to be processed and a value 1 indicates that it is to be processed. Naturally, the inverse can be chosen by convention. This information is decoded by entropy decoding, for example CAVLC or CABAC.

During a step 24, the region or regions of the image of the reconstructed base layer identified by the information info decoded in step 22 is processed. The processing is for example a re-sampling of the region in the case of spatial scalability, a colour conversion in the case of CGS scalability, a noise reduction filtering in the case of SNR scalability. This solution advantageously enables only the useful regions of the reconstructed image $I_{BL}$ to be processed, i.e. used in the reconstruction of blocks of an image $I_{EL}$ of the enhancement layer. Moreover, by proceeding thus the useful regions of the base layer are processed before the reconstruction of the blocks of the group of blocks and are thus all available during the reconstruction of the group of blocks which avoids too frequent accesses to the image buffer of the reconstructed base layer and too many calls on the processing function.

During a step 26, residues are obtained for at least one block of the group of blocks from a second part of the enhancement layer EL2. According to a variant, residues are obtained for each block of the group of blocks. This second part comprises data representative of residues for example quantized DCT coefficients from which residues are calculated or else a particular coding mode (skip mode) indicating that these residues are null. This step possibly comprises the entropy decoding, the inverse quantization and the inverse transformation of data of the second part, e.g. quantized DCT coefficients, to obtain the residues res. This second part possibly comprises motion data.

During a step 28, the blocks of the group are reconstructed from residues res and from the region processed. For this purpose, for each block of the group a predictor is obtained either from an image part previously reconstructed or from the same image as the current block of the group to reconstruct (spatial prediction) or from another image of the enhancement layer (temporal prediction) or even from the region of the reconstructed image $I_{BL}$ processed (inter-layer prediction). The predictor is added to the residues of the current block to reconstruct the current block. Note that according to a variant no predictor is added to the residues of the current block, in the specific case where the current block is coded without prediction (e.g. according to the IPCM coding mode of H.264). The residues correspond in the latter case directly to the reconstructed current block. In the group of blocks, the coding modes can be varied, some blocks being coded according to an IPCM mode, by spatial prediction, others by temporal prediction, others by inter-layer prediction and even others according to a skip mode. According to a particular embodiment, an additional item of information is decoded from the scalable stream, more precisely, from the enhancement layer for example of a PPS or of an image slice header that indicates for a group of blocks whether the item of information for identifying at least one region of the reconstructed image $I_{BL}$ to process is coded or not for this group of blocks. Using this particular information, it is possible to specify for each image or even for each image slice if the item of information for identifying at least one region of the reconstructed image $I_{BL}$ to process is coded or not.

Figure 5:
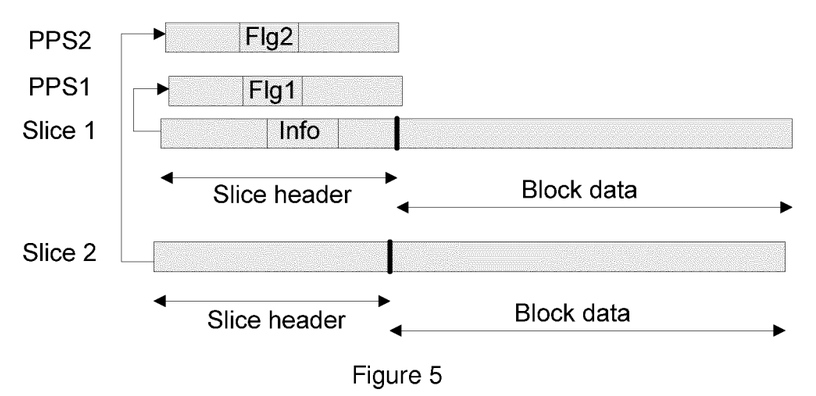
FIGS. 5 to 7 show parts of an enhancement layer according to different embodiments of the invention.
Figure 6:
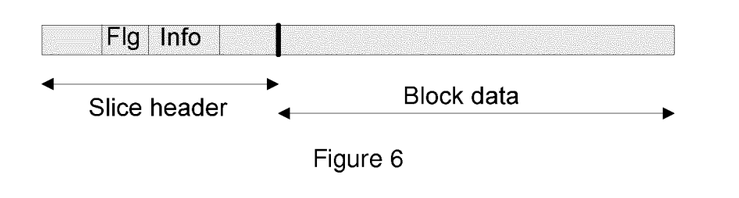

The additional information is for example a flag, i.e. a binary data. As a simple illustrative example, a first PPS1 is decoded with the additional value equal to FIG. 1, e.g. 1, indicating that the item of information for identifying the region of the reconstructed image $I_{BL}$ to process is coded. A second PPS1 is decoded with the additional value equal to FIG. 2, for example 0, indicating that the information for identifying at least one region of the reconstructed image $I_{BL}$ to process is not coded. Hence, each image of the enhancement layer can according to the case refer to one or other of the PPS. If an image of the enhancement layer $I_{EL}$ refers to the first PPS1, then an item of information for identifying at least one region of the reconstructed image $I_{BL}$ to process is decoded, e.g. in each slice header of the image of the enhancement layer as shown in FIG. 5. In the case where an image $J_{EL}$ refers to the PPS2 no item of information info is present. According to a variant, this flag can be coded in each image slice header, in which case if the value indicates that the item of information for identifying at least one region of the reconstructed image $I_{BL}$ to process is coded, this item of information for identifying at least one region of the reconstructed image $I_{BL}$ to process follows in the additional information stream FIG. as shown in FIG. 6.

Figure 7:
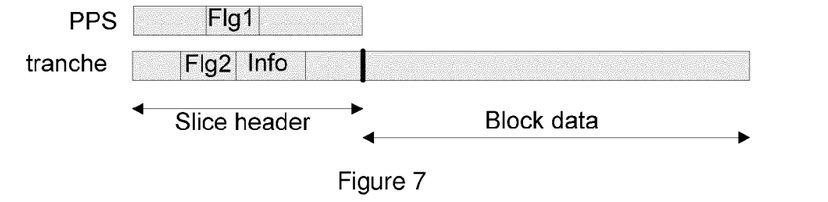

According to another embodiment illustrated by FIG. 7, a first item of additional information FIG. 1 is decoded from the enhancement layer that indicates whether the information info for identifying at least one region of the reconstructed image $I_{BL}$ to process can be decoded or not for a group of blocks. This first item of additional information FIG. 1 is for example decoded from the PPS. For example, if its value is 0 this signifies that no item of information for identifying at least one region of the reconstructed image $I_{BL}$ to process can be decoded from the stream. If its value is 1, this signifies that an item of information for identifying at least one region of the reconstructed image $I_{BL}$ to process can be decoded. In this case, a second item of additional information FIG. 2 is decoded for example in the header of each image slice that indicates for a group of blocks whether the item of information info for identifying at least one region of the reconstructed image $I_{BL}$ to process is coded or not for this group of blocks. In the case where the second item of information indicates for a group of blocks that said item of information for identifying at least one region of the reconstructed image $I_{BL}$ to process is coded, this item of information info follows the second item of information in the stream. This solution enables greater flexibility.

Figure 8:
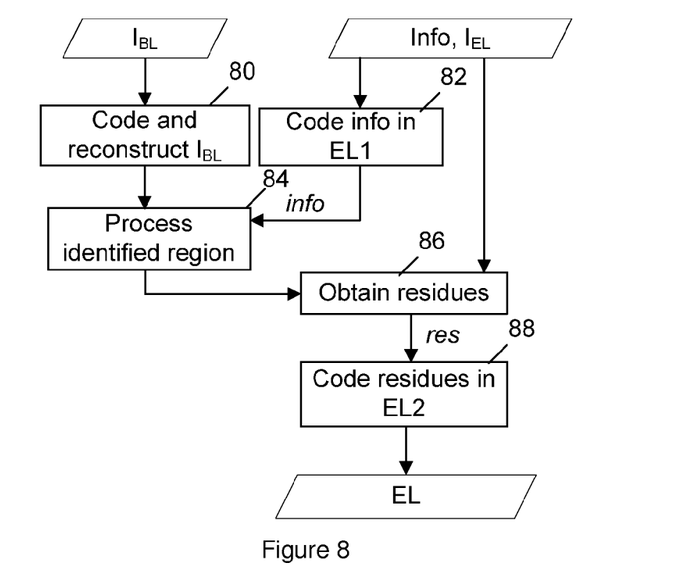
FIG. 8 shows a coding method according to a particular and non-restrictive embodiment of the invention.

FIG. 8 shows a coding method of an image sequence in the form of a scalable stream comprising a base layer and at least one enhancement layer according to a particular and non-restrictive embodiment of the invention. The same variants as the ones described in relation to the decoding method apply to the coding method even in the case where they may not be described explicitly in the remainder of the description.

During a step 80, at least one image $I_{BL}$ of the base layer is coded in the base layer. The coding generally comprises, for blocks of the image, the spatial or temporal prediction of the blocks, the obtaining of residues by subtracting a predictor from the block to code, the transformation and quantization of residues before the entropy coding. The same coding modes described in relation to the decoding method can be used, particularly the skip mode and IPCM coding mode of AVC. Other data is also coded such as coding modes, possibly motion data. The coding comprises the reconstruction of the image of the base layer. Indeed, the latter can then be used for the prediction of other data. These steps are well known to those skilled in the specialised art of video coding and will not be described in further detail. The process can be reiterated for all the images of the base layer so as to code the entire sequence.

During a step 82, enhancement data is coded in a first part of the enhancement layer EL1 relating to a group of blocks of the image of the enhancement layer to reconstruct. A group of blocks is for example an image or a slice of images. For example, this enhancement data is coded in an image slice header, in PPS or even in an SEI message. Indeed, such elements contain information relating to a group of blocks. However, note that an image slice can only contain a single block. However, coding images with image slices of a single block is ineffective in terms of bitrate. Slice coding, each slice containing several blocks, e.g. 2 blocks, groups common information together and thus prevents duplicating the same information in the headers of each block. Advantageously, this coded enhancement data comprises an item of information info for identifying at least one region of the reconstructed image $I_{BL}$ to process. For example, this information is obtained during a previous step of deciding on the coding mode. Indeed, as soon as the coding modes of the blocks of the group are selected, for example by minimising a bitrate-distortion type criterion, this map can be constructed. Indeed, all the blocks of the map that correspond to an inter-layer prediction mode are predicted in relation to a block of the image of the reconstructed base layer processed. This block must then be identified in the map as belonging to the region to process. Hence, from the decoding of the first part of enhancement layer EL1 relating to the group of blocks, the decoder has knowledge of the region or regions of the reconstructed image $I_{BL}$ to process, i.e. the one(s) that will effectively be used during the reconstruction of an image of the enhancement layer. This information can thus distinguish between the regions of the reconstructed image $I_{BL}$ that will be used during the reconstruction of an image of the enhancement layer and hence that must be processed and those that will not be used and hence that must not be processed. This information info is presented for example in the form of a map indicating for each block of the group of blocks of the enhancement layer whether the corresponding region, e.g. the block, of the base layer must be processed or not. A region of the reconstructed image $I_{BL}$ corresponds to a block of an image of the enhancement layer if it is co-located, i.e. if it occupies in the image the same spatial position possibly after processing (spatial scalability case). As a variant, the information info is presented for example in the form of a map indicating for each region, e.g. block, of the reconstructed image $I_{BL}$ corresponding to a block of the group of blocks if said region must be processed or not. This information irrespective of whether it relates to the base layer or to the enhancement layer is coded in the form of a regular map, e.g. in the case of the HEVC standard for each CTU (Coding Tree Unit) or for example for each macroblock as shown in FIG. 3. According to an embodiment variant, this information is coded in the form of an irregular map, e.g. in the case of the HEVC standard for each CU (Coding Unit) as shown in FIG. 4. In these figures, a value 0 indicates that the reconstructed region $I_{BL}$ is not to be processed and a value 1 indicates that it is to be processed. Naturally, the inverse can be chosen by convention. This information is coded by entropy coding, for example CAVLC or CABAC.

During a step 84, the region or regions of the image of the reconstructed base layer identified by the information info coded in step 82 is/are processed.

The processing is for example a re-sampling of the region in the case of spatial scalability, a colour conversion in the case of CGS scalability, a noise reduction filtering in the case of SNR scalability.

This solution advantageously enables only the useful regions of the reconstructed image $I_{BL}$ to be processed, i.e. used in the coding of blocks of an image $I_{EL}$ of the enhancement layer. Moreover, by proceeding thus the useful regions of the base layer are processed before the coding of the blocks of the group of blocks and are thus all available during the coding of the group of blocks which avoids too frequent accesses to the image buffer of the reconstructed base layer and too many calls on the processing function.

During a step 86, residues are obtained for at least one block of the group from blocks of the group and from the region processed. According to a variant, residues are obtained for each block of the group of blocks. For this purpose, for each block of the group a predictor is obtained either from an image part previously reconstructed or from the same image as the current block to code (spatial prediction) or from another image of the enhancement layer (temporal prediction) or even from the region of said reconstructed image $I_{BL}$ processed (inter-layer prediction). The predictor is subtracted from the current block to obtain residues. Note that according to a variant no predictor is subtracted from the current block, in the case where the block was coded without prediction (e.g. IPCM coding mode of H.264). The residues block corresponds in the latter case directly to the block to code. In the case of the skip mode, the residues are null. It is the coding mode of the block coded in the stream that indicates it In the group of blocks, the coding modes can be varied, some blocks being coded according to an IPCM mode, by spatial prediction, others by temporal prediction, others by inter-layer prediction and even others according to a skip mode.

During a step 88, the residues relating to at least one block of the group of blocks are coded in a second part of the enhancement layer. This step possibly comprises the transformation and quantization of the residues before their entropy coding.

According to a particular embodiment, the additional information shown in FIGS. 5 to 7 and described in relation to the decoding method is coded in the scalable stream S. All the embodiments described in relation to the decoding method apply symmetrically to the coding method.

The invention also relates to a scalable stream representative of an image sequence. This stream is for example produced by the coding method described previously.

This scalable stream comprises a base layer and at least one enhancement layer. The base layer comprises data relating to at least one image of the base layer.

The enhancement layer comprises in a first part EL1 relating to a group of blocks enhancement data which comprise an item of information for identifying at least one region of the image of the base layer to process after its reconstruction.

The enhancement layer comprises in a second part EL2 data representative of residues for at least one block of the group of blocks, the residues being obtained from at least one block of the group and from the region processed. According to a variant, the enhancement layer comprises in a second part EL2 data representative of residues for each of the blocks of the group of blocks. This data comprises for example a coding mode, possibly motion data, of data relating to residues (e.g. quantized DCT coefficients) or of data enabling such residues to be determined, e.g. the skip coding mode.

Advantageously, the scalable stream comprises the additional information shown in FIGS. 5 to 7 and described in relation to the decoding method.

Figure 9:
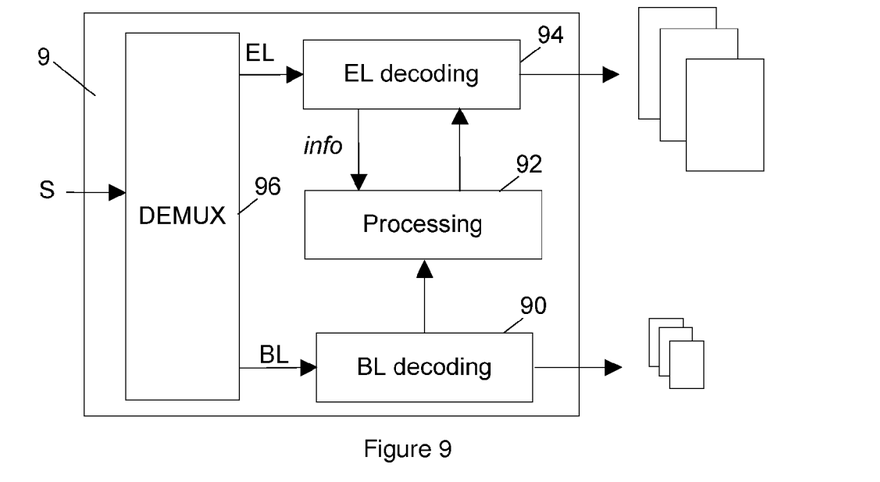
FIGS. 9 and 10 show a decoding device according to particular and non-restrictive embodiments of the invention.

FIG. 9 shows a decoding device 9 according to a non-restrictive embodiment of the invention.

The decoding device 9 comprises a decoding module 90 able to decode a base layer BL of a scalable stream S and to reconstruct images of the base layer. The decoding module 90 is notably configured to implement step 20 of the decoding method. The decoding device 9 further comprises a processing module 92 able to process at least one region of an image of the reconstructed base layer. The processing module 92 is notably configured to implement step 24 of the decoding method. The decoding device 9 also comprises another decoding module 94 able to decode an enhancement layer EL of a scalable stream S and to reconstruct images of the enhancement layer. The decoding module 94 is also able to supply the processing module 92 with the information info. The decoding module 94 is notably configured to implement steps 22, 26 and 28 of the decoding method. The decoding device 9 optionally comprises a demultiplexing module 96 configured to demultiplex the scalable stream S into a base layer BL and one or more enhancement layers EL.

Figure 10:
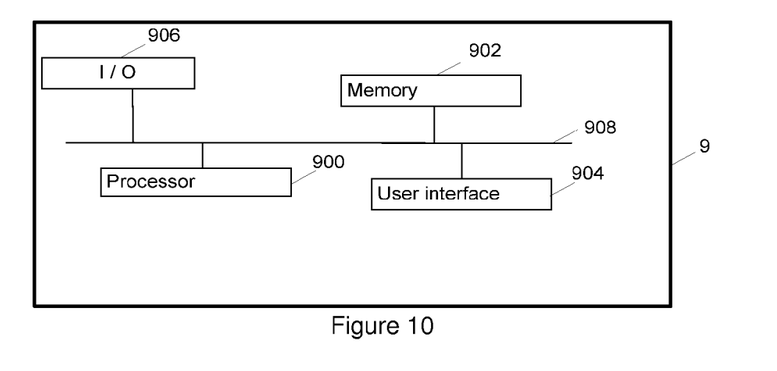

FIG. 10 shows a particular implementation of such a decoding device 9. The decoding device 9 comprises hardware components such as at least a processor 900 (e.g. CPU/GPU), a memory 902 (e.g. RAM), a user interface 904 (e.g. keyboards, mouse, etc.) and one or more input/output interfaces 906 able to be connected to other devices. These components are for example interconnected by an address and data bus 908. According to an implementation example, when powered up, the processor 900 loads the instructions corresponding to the steps of the decoding method into the memory 902 and executes them.

According to a particular embodiment, the decoding device 9 advantageously comprises an interface to read a computer program stored on a digital data support 910 that stores the program code instructions, that when they are executed by the processor 900, carry out the steps of the decoding method according to any one of the embodiments of the invention described previously. According to a variant, the user interface is external to the decoding device 9.

Figure 11:
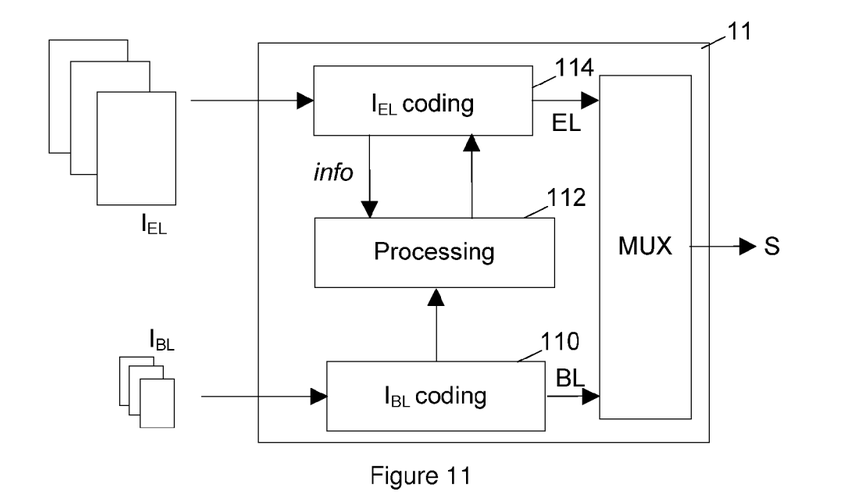
FIGS. 11 and 12 show a coding device according to particular and non-restrictive embodiments of the invention.

FIG. 11 shows a coding device 11 according to a non-restrictive embodiment of the invention. The coding device 11 comprises a coding module 110 able to code and reconstruct images $I_{BL}$ in a base layer BL of a scalable stream. The coding module 110 is notably configured to implement step 80 of the coding method. The coding device 11 further comprises a processing module 112 able to process at least one part of an image of the reconstructed base layer. The processing module 112 is notably configured to implement step 84 of the coding method. The coding device 11 also comprises another coding module 114 able to code images $I_{EL}$ in an enhancement layer EL of the scalable stream S. The coding module 114 is also able to supply the processing module 112 with the information info. The coding module 114 is notably configured to implement steps 82, 86 and 88 of the coding method. The coding device 11 optionally comprises a multiplexing module 116 configured to multiplex the base layer and enhancement layer or layers into a single scalable stream S.

Figure 12:
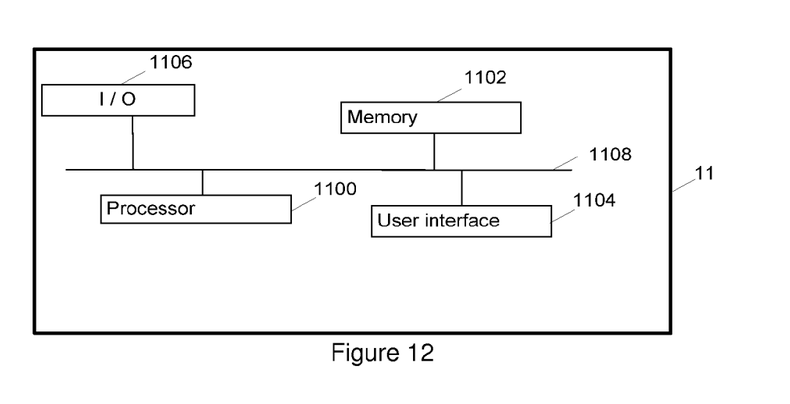

FIG. 12 shows a particular implementation of such a coding device 11. The coding device 11 comprises hardware components such as at least a processor 1100 (e.g. CPU/GPU), a memory 1102 (e.g. RAM), a user interface 1104 and one or more input/output interfaces 1106 able to be connected to other devices. These components are for example interconnected by an address and data bus 1108. According to an implementation example, when powered up, the processor 1100 loads the instructions corresponding to the steps of the coding method into the memory 1102 and executes them.

The coding device 11 advantageously comprises an interface to read a computer program stored on a digital data support 1110 that stores the program code instructions, that when they are executed by the processor 1100, carry out the steps of the coding method according to any one of the embodiments of the invention described previously. According to a variant, the user interface is external to the coding device 11.

The decoding 9 and coding 11 devices described are simplified for reasons of clarity. Real devices may comprise other elements such as for example an internal or external battery, non-volatile memory (e.g. flash memory, hard disk drive, etc.), etc. According to variants, decoding 9 and coding 11 devices compatible with the invention are implemented according to a purely hardware embodiment, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a combination of hardware elements and software elements.

Each embodiment can be used independently from the other embodiments or else the embodiments can be combined with each other.

Naturally, the invention described for a base layer and an enhancement layer can be applied to two enhancement layers of different levels, the lower enhancement layer playing the role of a base layer with respect to the upper level layer. Furthermore, the invention is not restricted by the type of quantizing, transform or entropy coding used.

The invention claimed is:

1. A method for decoding a scalable stream comprising a base layer and at least one enhancement layer, the method comprising:
reconstructing at least one image from said base layer,
decoding a first part of said at least one enhancement layer relating to a group of a plurality of blocks into decoded enhancement data which comprise at least one item of information for identifying at least one region of said reconstructed at least one image,
processing said at least one region of said reconstructed at least one image identified by said at least one item of information,
obtaining residues for at least a first block and a second block of said group from a second part of said at least one enhancement layer, wherein the residues for the first block are obtained from another image previously reconstructed and the residues for the second block are obtained from another image of the enhancement layer, and
reconstructing the at least a first block and a second block from said residues and from said processed at least one region.

2. Method according to claim 1, wherein said at least one item of information for identifying at least one region of said reconstructed at least one image is a map indicating for each block of said reconstructed at least one image corresponding to a block of said group if said block of said reconstructed at least one image must be processed or not.

3. Method according to claim 1, wherein said at least one item of information for identifying at least one region of said reconstructed at least one image is a map indicating for each block of said group if said block of said group uses for its reconstruction a processed block of said reconstructed at least one image.

4. Method according to claim 1, comprising decoding, from said at least one enhancement layer, an item of additional information for said group indicating whether said at least one item of information for identifying at least one region of said reconstructed at least one image is coded or not for said group.

5. Method according to claim 1, comprising decoding, from said at least one enhancement layer, a first item of additional information, for at least one image of said at least one enhancement layer, indicating whether said at least one item of information for identifying at least one region of said reconstructed at least one image can be coded or not for a group of a plurality of blocks of said at least one image of said enhancement layer.

6. Method according to claim 5, wherein the method comprises, in the case where said first item of additional information indicates that said at least one item of information for identifying at least one region of said reconstructed at least one image can be coded, decoding, from said at least one enhancement layer, a second item of additional information indicating for said group of a plurality of blocks of said at least one image of said enhancement layer whether said at least one item of information for identifying at least one region of said reconstructed at least one image is coded or not for said group of a plurality of blocks of said at least one image of said enhancement layer.

7. A method for coding a sequence of images in the form of a scalable stream comprising a base layer and at least one enhancement layer, the method comprising:
coding at least one image in said base layer and reconstructing said at least one image,
coding enhancement data in a first part of said at least one enhancement layer relating to a group of a plurality of blocks, said enhancement data comprising at least one item of information for identifying at least one region of said reconstructed at least one image,
processing said at least one region of said reconstructed at least one image identified by said at least one item of information,
obtaining residues for at least a first block and a second block of said group from said at least a first block and a second block and from said processed at least one region, wherein the residues for the first block are obtained from another image previously reconstructed and the residues for the second block are obtained from another image of the enhancement layer, and
coding the residues for at least a first block and a second block in a second part of said at least one enhancement layer.

8. Method according to claim 7, wherein said at least one item of information for identifying at least one region of said reconstructed at least one image is a map indicating for each block of said reconstructed at least one image corresponding to a block of said group if said block of said reconstructed at least one image must be processed or not.

9. Method according to claim 7, wherein said at least one item of information for identifying at least one region of said reconstructed at least one image is a map indicating for each block of said group if said block of said group uses for its reconstruction a processed block of said reconstructed at least one image.

10. Method according to claim 7, comprising coding, in said at least one enhancement layer, an item of additional information for said group indicating whether said at least one item of information for identifying at least one region of said reconstructed at least one image is coded or not for said group.

11. Method according to claim 7, comprising coding, in said at least one enhancement layer, a first item of additional information, for at least one image of said at least one enhancement layer, indicating whether said at least one item of information for identifying at least one region of said reconstructed at least one image can be coded or not for a group of a plurality of blocks of said at least one image of said at least one enhancement layer.

12. Method according to claim 11, wherein the method comprises, in the case where said first item of additional information indicates that said at least one item of information for identifying at least one region of said reconstructed at least one image can be coded, coding, in said at least one enhancement layer, a second item of additional information indicating for said group of a plurality of blocks of said at least one image of said at least one enhancement layer whether said at least one item of information for identifying at least one region of said reconstructed at least one image is coded or not for said group of a plurality of blocks of said at least one image of said at least one enhancement layer.

13. A decoder configured for decoding a scalable stream comprising a base layer and at least one enhancement layer, the decoder comprising an input interface configured to access said scalable stream and at least one processor configured to:
reconstruct at least one image from said base layer,
decode a first part of said at least one enhancement layer relating to a group of a plurality of blocks into decoded enhancement data which comprise at least one item of information for identifying at least one region of said reconstructed at least one image,
process said at least one region of said reconstructed at least one image identified by said at least one item of information,
obtain residues for at least a first block and a second block of said group from a second part of said at least one enhancement layer, wherein the residues for the first block are obtained from another image previously reconstructed and the residues for the second block are obtained from another image of the enhancement layer, and
reconstruct the at least a first block and a second block from said residues and from said processed at least one region.

14. A coder configured to code a sequence of images in the form of a scalable stream comprising a base layer and at least one enhancement layer, the coder comprising an input interface configured to access said sequence of images and at least one processor configured to:
code at least one image of said accessed sequence in said base layer and reconstruct said at least one image,
code enhancement data in a first part of said at least one enhancement layer relating to a group of a plurality of blocks, said enhancement data comprising at least one item of information for identifying at least one region of said reconstructed at least one image,
process said at least one region of said reconstructed at least one image identified by said at least one item of information,
obtain residues for at least a first block and a second block of said group from said at least a first block and a second block and from said processed at least one region, wherein the residues for the first block are obtained from another image previously reconstructed and the residues for the second block are obtained from another image of the enhancement layer, and
code the residues for at least a first block and a second block in a second part of said at least one enhancement layer.

15. A computer program product stored in a non-transitory computer readable storage medium for decoding a scalable stream having a base layer and at least one enhancement layer, comprising computer-executable instructions for:
reconstructing at least one image from said base layer,
decoding a first part of said at least one enhancement layer relating to a group of a plurality of blocks into decoded enhancement data which comprise at least one item of information for identifying at least one region of said reconstructed at least one image,
processing said at least one region of said reconstructed at least one image identified by said at least one item of information,
obtaining residues for at least a first block and a second block of said group from a second part of said at least one enhancement layer, wherein the residues for the first block are obtained from another image previously reconstructed and the residues for the second block are obtained from another image of the enhancement layer, and
reconstructing the at least a first block and a second block from said residues and from said processed at least one region.

16. Method according to claim 1, wherein said group is an image slice.

17. Method according to claim 7, wherein the group is an image slice.

18. Device according to claim 13, wherein said at least one item of information for identifying at least one region of said reconstructed at least one image is a map indicating for each block of said reconstructed at least one image corresponding to a block of said group if said block of said reconstructed at least one image must be processed or not.

19. Device according to claim 13, wherein said at least one item of information for identifying at least one region of said reconstructed at least one image is a map indicating for each block of said group if said block of said group uses for its reconstruction a processed block of said reconstructed at least one image.

20. Device according to claim 13, wherein said at least one processor is further configured to decode, from said at least one enhancement layer, an item of additional information for said group indicating whether said at least one item of information for identifying at least one region of said reconstructed at least one image is coded or not for said group.

21. Device according to claim 13, wherein said at least one processor is further configured to decode, from said at least one enhancement layer, a first item of additional information, for at least one image of said at least one enhancement layer, indicating whether said at least one item of information for identifying at least one region of said reconstructed at least one image can be coded or not for a group of a plurality of blocks of said at least one image of said enhancement layer.

22. Device according to claim 21, wherein said at least one processor is further configured to decode, from said at least one enhancement layer, a second item of additional information indicating for said group of a plurality of blocks of said at least one image of said enhancement layer whether said at least one item of information for identifying at least one region of said reconstructed at least one image is coded or not for said group of a plurality of blocks of said at least one image of said enhancement layer, in the case where said first item of additional information indicates that said at least one item of information for identifying at least one region of said reconstructed at least one image can be coded.

23. Device according to claim 14, wherein said at least one item of information for identifying at least one region of said reconstructed at least one image is a map indicating for each block of said reconstructed at least one image corresponding to a block of said group if said block of said reconstructed at least one image must be processed or not.

24. Device according to claim 14, wherein said at least one item of information for identifying at least one region of said reconstructed at least one image is a map indicating for each block of said group if said block of said group uses for its reconstruction a processed block of said reconstructed at least one image.

25. Device according to claim 14, wherein said at least one processor is further configured to code, in said at least one enhancement layer, an item of additional information for said group indicating whether said at least one item of information for identifying at least one region of said reconstructed at least one image is coded or not for said group.

26. Device according to claim 14, wherein said at least one processor is further configured to code, in said at least one enhancement layer, a first item of additional information, for at least one image of said at least one enhancement layer, indicating whether said at least one item of information for identifying at least one region of said reconstructed at least one image can be coded or not for a group of a plurality of blocks of said at least one image of said at least one enhancement layer.

27. Device according to claim 26, wherein said at least one processor is further configured to code, in said at least one enhancement layer, a second item of additional information indicating for said group of a plurality of blocks of said at least one image of said at least one enhancement layer whether said at least one item of information for identifying at least one region of said reconstructed at least one image is coded or not for said group of a plurality of blocks of said at least one image of said at least one enhancement layer, in the case where said first item of additional information indicates that said at least one item of information for identifying at least one region of said reconstructed at least one image can be coded.

28. The device according to claim 13, wherein said group is an image slice.

29. The device according to claim 14, wherein the group is an image slice.

30. The non-transitory storage medium according to claim 15, wherein said at least one item of information for identifying at least one region of said reconstructed at least one image is a map indicating for each block of said reconstructed at least one image corresponding to a block of said group if said block of said reconstructed at least one image must be processed or not.

31. The non-transitory storage medium according to claim 15, wherein said at least one item of information for identifying at least one region of said reconstructed at least one image is a map indicating for each block of said group if said block of said group uses for its reconstruction a processed block of said reconstructed at least one image.

32. The non-transitory storage medium according to claim 15, wherein said at least one enhancement layer further comprises an item of additional information for said group indicating whether said at least one item of information for identifying at least one region of said reconstructed at least one image is coded or not for said group.

33. The non-transitory storage medium according to claim 15, wherein said at least one enhancement layer comprises a first item of additional information, for at least one image of said at least one enhancement layer, indicating whether said at least one item of information for identifying at least one region of said reconstructed at least one image can be coded or not for a group of a plurality of blocks of said at least one image of said at least one enhancement layer.

34. The non-transitory storage medium according to claim 33, wherein in the case where said first item of additional information indicates that said at least one item of information for identifying at least one region of said reconstructed at least one image can be coded, said at least one enhancement layer comprises a second item of additional information indicating for said group of a plurality of blocks of said at least one image of said at least one enhancement layer whether said at least one item of information for identifying at least one region of said reconstructed at least one image is coded or not for said group of a plurality of blocks of said at least one image of said at least one enhancement layer.

35. The non-transitory storage medium according to claim 15, wherein said group is an image slice.

* * * * *